United States Patent
Gorlin et al.

(10) Patent No.: US 12,002,963 B2
(45) Date of Patent: Jun. 4, 2024

(54) ELECTRODE CONFIGURATION WITH A PROTRUSION INHIBITING SEPARATOR

(71) Applicants: Yelena Gorlin, Los Altos, CA (US); John F. Christensen, Elk Grove, CA (US); Nathan P. Craig, Santa Clara, CA (US); Georgy Samsonidze, San Francisco, CA (US); Ramachandran Subbaraman, Oakland, CA (US); Robert Bosch GmbH, Stuttgart (DE)

(72) Inventors: Yelena Gorlin, Los Altos, CA (US); John F. Christensen, Elk Grove, CA (US); Nathan P. Craig, Santa Clara, CA (US); Georgy Samsonidze, San Francisco, CA (US); Ramachandran Subbaraman, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 811 days.

(21) Appl. No.: 17/054,639

(22) PCT Filed: May 28, 2019

(86) PCT No.: PCT/US2019/034138
§ 371 (c)(1),
(2) Date: Nov. 11, 2020

(87) PCT Pub. No.: WO2019/231892
PCT Pub. Date: Dec. 5, 2019

(65) Prior Publication Data
US 2021/0194008 A1    Jun. 24, 2021

Related U.S. Application Data

(60) Provisional application No. 62/678,734, filed on May 31, 2018.

(51) Int. Cl.
*H01M 4/62* (2006.01)
*H01M 4/38* (2006.01)
(Continued)

(52) U.S. Cl.
CPC ........... *H01M 4/628* (2013.01); *H01M 4/382* (2013.01); *H01M 4/5825* (2013.01);
(Continued)

(58) Field of Classification Search
CPC .... H01M 4/628; H01M 4/382; H01M 4/5825; H01M 2004/027; H01M 2004/028;
(Continued)

(56) References Cited

U.S. PATENT DOCUMENTS 7,211,351 B2    5/2007    Klaassen
7,776,478 B2    8/2010    Klaassen
(Continued)

FOREIGN PATENT DOCUMENTS

EP    1911118 B1    3/2014
JP    2002110243 A    4/2002
(Continued)

OTHER PUBLICATIONS

International Search Report corresponding to PCT Application No. PCT/US2019/034138, dated Sep. 16, 2019 (3 pages).
(Continued)

*Primary Examiner* — James M Erwin
(74) *Attorney, Agent, or Firm* — Maginot, Moore & Beck LLP

(57) ABSTRACT

An electrode configuration for a battery cell includes a positive electrode, a negative electrode, and a separator interposed between the positive electrode and the negative electrode. The separator includes an electrically conductive protrusion inhibiting layer and a first insulating layer inter-
(Continued)

posed between and electrically insulating the protrusion inhibiting layer from one of the positive and negative electrode.

20 Claims, 3 Drawing Sheets

(51) Int. Cl.
*H01M 4/58* (2010.01)
*H01M 50/431* (2021.01)
*H01M 50/434* (2021.01)
*H01M 50/449* (2021.01)
*H01M 50/46* (2021.01)
*H01M 4/02* (2006.01)

(52) U.S. Cl.
CPC ....... *H01M 50/431* (2021.01); *H01M 50/434* (2021.01); *H01M 50/449* (2021.01); *H01M 50/46* (2021.01); *H01M 2004/027* (2013.01); *H01M 2004/028* (2013.01)

(58) Field of Classification Search
CPC .. H01M 50/46; H01M 50/449; H01M 50/434; H01M 50/431
USPC ......................................................... 429/209
See application file for complete search history.

(56) References Cited

U.S. PATENT DOCUMENTS

| | | |
|---|---|---|
| 8,268,197 B2 | 9/2012 | Singh et al. |
| 8,431,050 B2 | 4/2013 | Li et al. |
| 8,563,168 B2 | 10/2013 | Balsara et al. |
| 8,889,301 B2 | 11/2014 | Balsara et al. |
| 8,906,449 B2 | 12/2014 | Li et al. |
| 8,927,152 B2 | 1/2015 | Chung et al. |
| 9,136,562 B2 | 9/2015 | Singh et al. |
| 9,276,292 B1 | 3/2016 | MacKenzie et al. |
| 2004/0029010 A1 | 2/2004 | Sada et al. |
| 2004/0029014 A1 | 2/2004 | Hwang et al. |
| 2007/0015060 A1 | 1/2007 | Klaassen |
| 2009/0061288 A1 | 3/2009 | Gordon et al. |
| 2011/0281173 A1 | 11/2011 | Singh et al. |
| 2011/0311882 A1 | 12/2011 | Kim et al. |
| 2012/0141881 A1 | 6/2012 | Geier et al. |
| 2013/0065134 A1 | 3/2013 | Ogawa et al. |
| 2013/0266842 A1 | 10/2013 | Woehrle et al. |
| 2013/0273409 A1 | 10/2013 | Nandi et al. |
| 2014/0234726 A1 | 8/2014 | Christensen et al. |
| 2014/0272569 A1 | 9/2014 | Cai et al. |
| 2014/0342209 A1 | 11/2014 | He et al. |
| 2014/0346392 A1 | 11/2014 | Yeon et al. |
| 2015/0050543 A1* | 2/2015 | Christensen ........ H01M 10/052 29/623.5 |
| 2015/0099185 A1 | 4/2015 | Joo et al. |
| 2015/0318532 A1 | 11/2015 | Manthiram et al. |
| 2016/0006033 A1 | 1/2016 | Sheem |
| 2016/0118695 A1 | 4/2016 | Lee et al. |
| 2016/0211547 A1 | 7/2016 | Hwang et al. |
| 2016/0268627 A1 | 9/2016 | Lee et al. |
| 2016/0351878 A1 | 12/2016 | Visco et al. |
| 2017/0005373 A1 | 1/2017 | Tashiro |
| 2017/0025658 A1* | 1/2017 | Shi .......................... C23C 14/24 |
| 2017/0077496 A1 | 3/2017 | Liu et al. |
| 2017/0162900 A1 | 6/2017 | Lu et al. |
| 2017/0233579 A1* | 8/2017 | Yushin ..................... C07F 5/06 427/212 |
| 2018/0026302 A1 | 1/2018 | Kumar et al. |
| 2018/0358598 A1 | 12/2018 | Craig et al. |
| 2019/0036158 A1 | 1/2019 | Christensen et al. |

FOREIGN PATENT DOCUMENTS

| | | |
|---|---|---|
| JP | 2009043737 A | 2/2009 |
| JP | 2010262860 A | 11/2010 |
| JP | 2013-532361 A | 8/2013 |
| KR | 1020160150555 A | 12/2016 |

OTHER PUBLICATIONS

Bai, P. et al. Transition of lithium growth mechanisms in liquid electrolytes, Energy & Environmental Science, 2016, vol. 9, pp. 3221-3229, Sep. 1, 2016. Royal Society of Chemistry.

Suo, L. et al. A new class of Solvent-in-Salt electrolyte for high-energy rechargeable metallic lithium batteries. Nat. Commun. 4:1481 doi: 10.1038/ncomms2513. Feb. 12, 2013. Macmillan Publishers Limited.

Manthiram, A. et al. "Lithium battery chemistries enabled by solid-state electrolytes," Nature Reviews Materials, vol. 2, p. 16103, 2017.

* cited by examiner

ELECTRODE CONFIGURATION WITH A PROTRUSION INHIBITING SEPARATOR

CLAIM OF PRIORITY

This application is a 35 U.S.C. § 371 National Stage Application of PCT/US2019/034138 filed on May 28, 2019, which claims priority to U.S. Provisional Application No. 62/678,734 entitled "Battery Having a Protrusion Inhibiting Separator" filed May 31, 2018, the disclosures of which are incorporated herein by reference in its their entirety.

TECHNICAL FIELD

This disclosure relates generally to batteries, and more particularly to layer configurations for batteries.

BACKGROUND

In batteries, ions transfer between the negative electrode ("anode") and positive electrode ("cathode") during charge and discharge cycles. For instance, when discharging, electrons flow from the negative electrode, through an external circuit, to the positive electrode to generate an electrical current in the external circuit. During this process, positive ions, for example lithium ions in a lithium-ion battery, travel within the battery from the negative electrode, through an electrolyte, to the positive electrode. Conversely, when charging, the external circuit supplies current that reverses the flow of electrons from the positive electrode, through the external charging circuit, and back to the negative electrode, while the positive ions move within the battery from the positive electrode through the electrolyte to the negative electrode.

A typical lithium-ion ("Li-ion") battery has a battery separator interposed between the negative electrode and positive electrode. The separator layer includes an electrolyte that conducts lithium ions so as to provide a continuous ionic pathway for lithium ions to be transported between the two electrodes.

One of the current limitations in implementation of lithium negative electrode is the inability to cycle lithium at high current densities. As the current density is increased, lithium protrusions, or dendrites, form on the surface of lithium. During the life of the battery, these protrusions can grow through the battery separator and create a contact between the two electrodes, causing a short circuit inside the battery.

Separators in conventional batteries are designed to be electronic insulators so that the electrons cannot flow between the electrodes of the battery. The requirement that the separators are electronic insulators, however, limits the materials that can be used in the separators to inhibit formation or growth of lithium protrusions.

What is needed therefore is an improved separator that can limit the growth of lithium protrusions and thus increase the current density at which the lithium negative electrode can be operated.

SUMMARY

In one embodiment, an electrode configuration for a battery comprises a positive electrode, a negative electrode, and a separator interposed between the positive electrode and the negative electrode. The separator includes an electrically conductive protrusion inhibiting layer and a first insulating layer interposed between and electrically insulating the protrusion inhibiting layer from one of the positive and negative electrode.

In another embodiment, the protrusion inhibiting layer of the electrode configuration is configured to mechanically inhibit growth of lithium protrusions on the other of the positive and negative electrode.

In a further embodiment, the protrusion inhibiting layer comprises one or more of carbon nanotubes, silver nanowires, particles of silver, particles of steel, particles of copper, and particles of lithium.

Some embodiments of the electrode configuration include a protrusion inhibiting layer that further comprises a primary lithium ion conducting material that includes at least one material selected from the group consisting of polyethylene oxide, lithium-lanthanum-zirconium-oxide (LLZO), lithium phosphorus oxynitride (LiPON), lithium-aluminum-titanium-phosphate (LATP), $Li_2S$—$P_2S_5$, and $Li_3PS_4$.

In yet another embodiment, the protrusion inhibiting layer is configured to chemically inhibit growth of lithium protrusions on the other of the positive and negative electrode.

In some embodiments, the protrusion inhibiting layer comprises an alloying material that alloys with lithium in the battery so as to inhibit growth of lithium protrusions. The alloying material may, in one particular embodiment, include one or more material selected from the group consisting of aluminum, tin, magnesium, silicon, silver, and gold.

The first electronically insulating layer, in one embodiment, includes one or more materials selected from the group consisting of: PEO with conducting salt; gels with the addition of carbonate solvent and conducting salt; ceramic single ion conductors; lithium-lanthanum-zirconium-oxide (LLZO); lithium phosphorus oxynitride (LiPON); lithium-aluminum-titanium-phosphate (LATP); glassy single ion conductors; atomic layer deposition layers of lithium conducting, electronically insulating materials; $Al_2O_3$; $Li_3P$; $Si_3N_4$; cation exchange polymers; and Nafion.

In another embodiment, the first electronically insulating layer has low permeability to counter-ions.

In yet another embodiment, the first electronically insulating layer includes a single ion conducting layer.

In one embodiment of the electrode configuration, the separator further comprises a second insulating layer that electrically insulates the protrusion inhibiting layer from the other of the positive and negative electrode.

In another embodiment, a battery cell includes an electrode configuration comprising a positive electrode, a negative electrode, and a separator interposed between the positive electrode and the negative electrode. The separator comprises an electrically conductive protrusion inhibiting layer and a first insulating layer interposed between one of the positive and negative electrode and electrically separating the protrusion inhibiting layer from the one of the positive and negative electrode.

In some embodiments of the battery cell, the protrusion inhibiting layer is configured to mechanically inhibit growth of lithium protrusions on the other of the positive and negative electrode.

In a further embodiment of the battery cell, the protrusion inhibiting layer comprises one or more of carbon nanotubes, silver nanowires, particles of silver, particles of steel, particles of copper, and particles of lithium.

The protrusion inhibiting layer may further comprise a primary lithium ion conducting material that includes at least one material selected from the group consisting of polyethylene oxide, lithium-lanthanum-zirconium-oxide (LLZO), lithium phosphorus oxynitride (LiPON), lithium-aluminum-titanium-phosphate (LATP), $Li_2S$—$P_2S_5$, and $Li_3PS_4$.

In yet another embodiment, the protrusion inhibiting layer is configured to chemically inhibit growth of lithium protrusions on the other of the positive and negative electrode.

In one embodiment of the battery cell, the protrusion inhibiting layer comprises an alloying material that alloys with lithium in the battery so as to inhibit growth of lithium protrusions. The alloying material, in some embodiments, includes one or more material selected from the group consisting of aluminum, tin, magnesium, silicon, silver, and gold.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

The terms "comprising," "including," "having," and the like, as used with respect to embodiments of the disclosure, are synonymous. As used herein, the term "approximately" refers to values that are within ±10% of the reference value.

The embodiments of the disclosure discussed below are applicable to any desired battery chemistry. Some examples refer to lithium-ion batteries for illustrative purposes. As used herein, the term "lithium-ion battery" refers to any battery which includes lithium as an active material. In particular, lithium-ion batteries include, without limitation, lithium batteries having liquid electrolytes, solid electrolytes, gel electrolytes, and batteries commonly referred to as lithium-polymer batteries or lithium-ion-polymer batteries. As used herein, the term "gel electrolyte" refers to a polymer infused with a liquid electrolyte.

Figure 1:
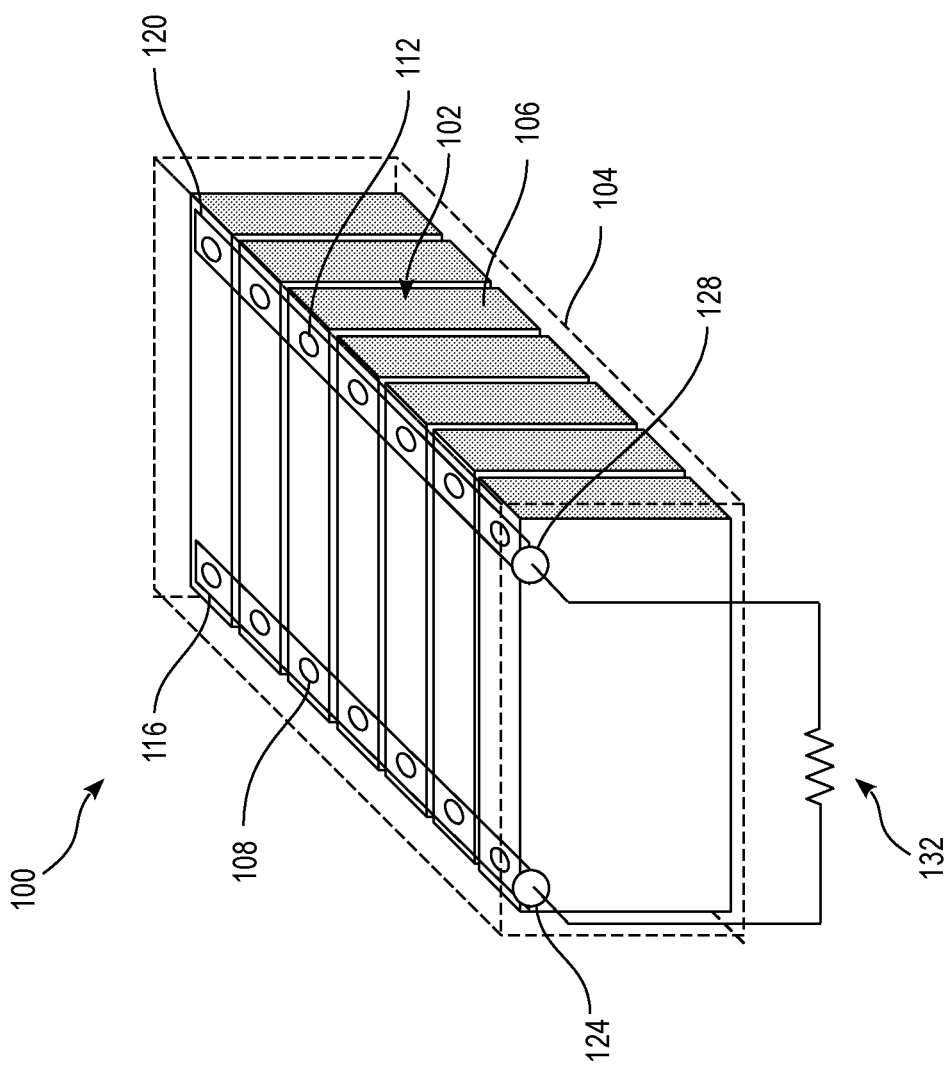
FIG. 1 is a schematic view of a battery pack according to the disclosure.

Referring now to FIG. 1, a battery pack 100 includes a plurality of battery cells 102 arranged in a pack housing 104. Each of the battery cells 102 includes a cell housing 106, from which a positive terminal 108 and a negative terminal 112 are exposed. In a parallel arrangement, the positive terminals 108 may be connected to one another by a current collector 116, and the negative terminals 112 may be connected to one another by a different current collector 120. In a series arrangement, the positive terminals 108 may be connected to adjacent negative terminals 112 by a current collector. The current collectors 116, 120 are connected to respective positive and negative battery pack terminals 124, 128, which connect to an external circuit 132 that may be powered by the battery pack 100, or may be configured to charge the battery pack 100.

Each battery cell 102 includes an electrode configuration 200, illustrated schematically in FIG. 1. The electrode configuration 200 includes a positive electrode ("cathode") 204, a separator layer 208, and a negative electrode ("anode") 212. In some embodiments, multiple layers of the electrode configuration 200 are stacked on top of one another so as to form an electrode stack. In other embodiments, the electrode configuration 200 is wound around itself in a spiral shape so as to form what is known as a "jelly-roll" or "Swiss-roll" configuration. In the illustrated embodiment, the battery electrode configuration 200 is a solid-state battery configuration.

In one embodiment, the positive electrode 204 includes or consists of a composite including: a polymer, liquid, ceramic, or glass, optionally with a conductive Li salt, for example $LiPF_6$ or LiTFSI (lithium bis(trifluoromethanesulfonyl)imide); an electronically conductive additive such as carbon black; and an active material that reacts reversibly with Li ions, such as for example lithium metal oxide ($Li_xMO_2$, wherein M is one or more of Ni, Co, Mn, Al, and/or other transition metals).

In some embodiments, the negative electrode 212 of the battery includes or consists of a bare current collector, for example copper or lithium metal. In other embodiments, the negative electrode 212 includes or consists of: a composite including a polymer, liquid, ceramic, or glass, optionally with a conductive Li salt, such $LiPF_6$ or LiTFSI; an electronically conductive additive such as carbon black; and an active material that reacts reversibly with lithium ions, for example graphite, silicon, silicon oxide, a mixture of graphite, silicon, and/or silicon oxide, or other desired materials.

The separator layer 208 is interposed between the positive electrode 204 and the negative electrode 212 so as to electronically separate the positive electrode 204 and negative electrode 212 from one another. The separator layer 208 includes at least one electrically insulating and ionically conducting separator component layer 220a, 220b next to either one or both electrodes 204, 212 in a Li-ion battery to allow the use of another separator layer, for instance a protrusion inhibiting layer 224, that has a non-negligible electronic conductivity, but can limit the growth of lithium protrusions through excellent mechanical, chemical, or ionic transport properties. As used herein, the term "protrusion inhibiting layer" refers to a layer that is configured, adapted, and designed to reduce or eliminate the growth of lithium protrusions through the separator layer.

Each of FIGS. 2-6 illustrates a different configuration of a separator layer 208, 208a, 208b, 208c, 208d. The separator layers 208, 208a, 208b, 208c, 208d each include at least one electronically insulating layer 220a, 220b and an electrically conductive protrusion inhibiting layer 224.

Figure 2:
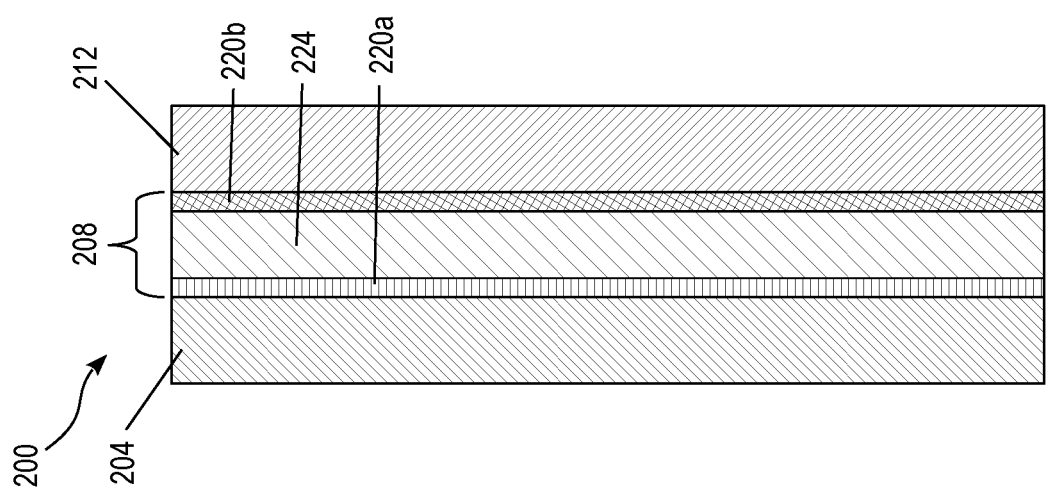
FIG. 2 is a schematic view of a battery electrode configuration of the battery pack of FIG. 1 having a separator layer that includes a lithium protrusion inhibiting layer separated from each of the electrodes by a respective electronically insulating layer.

In FIG. 2, the electronically insulating layers 220a, 220b are continuous electronically insulating and ionically conducting layers. One of the electronically insulating layers 220a, 220b is positioned adjacent to each of the positive electrode 204 and negative electrode 212, respectively. In some embodiments, the two electronically insulating layers 220a, 220b are formed of the same material, while in other embodiments the two electronically insulating layers 220a, 220b are formed of different materials. Each of the electronically insulating layers is formed of materials that are chemically compatible with the respective adjacent electrode 204, 212.

Figure 3:
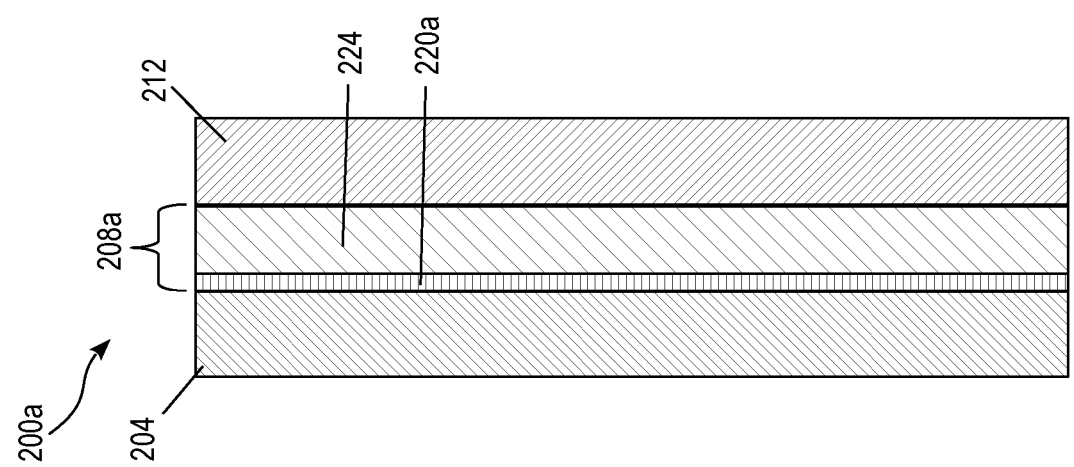
FIG. 3 is a schematic view of a battery cell of the battery pack of FIG. 1 having a separator layer that includes a lithium protrusion inhibiting layer separated from the positive electrode by an electronically insulating layer.

In the electrode configuration 200a of FIG. 3, the separator layer 208a includes an electronically insulating layer 220a on only the positive electrode 204 side of the separator layer 208. In the embodiment of FIG. 3, the protrusion inhibiting layer 224 is chemically compatible with the negative electrode 212 and in contact with the negative electrode 212. While the electrons can be conducted through the protrusion inhibiting layer 224, the electronically insulating layer 220a prevents conduction to the positive electrode 204 and thus prevents a short-circuit in a Li-ion battery with the electrode configuration 200a.

Figure 4:
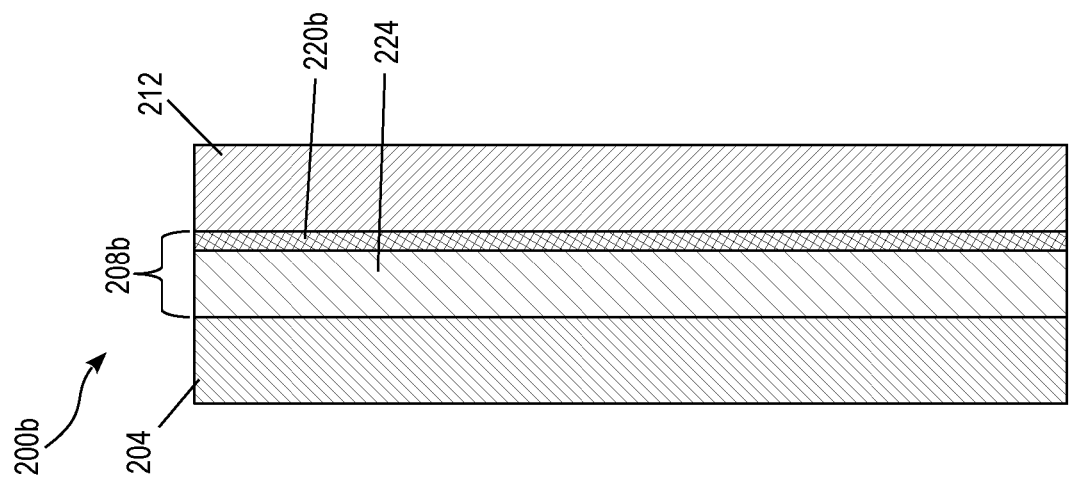
FIG. 4 is a schematic view of a battery cell of the battery pack of FIG. 1 having a separator layer that includes a lithium protrusion inhibiting layer separated from the negative electrode by an electronically insulating layer.

In the electrode configuration 200b of FIG. 4, the separator layer 208b includes an electronically insulating layer 220b only on the negative electrode 212 side of the separator layer 208. The protrusion inhibiting layer 224 is chemically compatible with the positive electrode 204 and in contact with the positive electrode 204. While the electrons are able to flow through the protrusion inhibiting layer 224 of the separator layer 208b, the electronically insulating layer 220b prevents conduction to the negative electrode 212 and thus prevents a short-circuit of the electrode configuration 200b.

The electronically insulating layers 220a, 220b may have various compositions, and may include, for example, ceramic, glass, and/or polymer materials. In some embodiments, the electronically insulating layers 220a, 220b are continuous homogenous layers, while in other embodiments the electronically insulating layers 220a, 220b include particles or flakes or a layer containing defects such as pinholes or cracks, provided that the introduced gaps between particles/flakes or defects in the layer are electronically insulating.

In some embodiments, the electronically insulating layers 220a, 220b have a thickness of less than 2 µm, while in other embodiments the electronically insulating layers 220a, 220b have a thickness of less than 1 µm, and, in still further embodiments, have a thickness of less than 0.5 µm. In the embodiments of the electronically insulating layers 220a, 220b that include particles, the dimensions of the particles are less than the overall thickness of the electronically insulating layers 220a, 220b.

In various embodiments, the electronically insulating layers 220a, 220b include one or more of the following materials: PEO with conducting salt; gels with the addition of carbonate solvent and conducting salt; ceramic single ion conductors such as LLZO (lithium-lanthanum-zirconium-oxide or lithium-lanthanum-zirconate), LiPON (lithium phosphorus oxynitride), LATP (lithium-aluminum-titanium-phosphate), etc.; glassy single ion conductors; ALD (atomic layer deposition) layers of Li conducting, electronically insulating materials such as $Al_2O_3$, $Li_3P$, $Si_3N_4$; and cation exchange polymers such as Nafion. In some embodiments, the electronically insulating layers may have electrical conductivity of less than $10^{-4}$ S/m. In further embodiments, the electronically insulating layer has electrical conductivity of less than $10^{-6}$ S/m.

In some embodiments, the electronically insulating layer(s) 220a, 220b have low permeability to counter-ions, which are the ions that do not participate in the electrode reactions. As used herein, "low permeability to counter-ions" is defined to mean that the layer has a lower permeability to the counter-ions as compared to the permeability of the ions involved in the electrode reactions. For example, one salt that may be used in a lithium-ion battery is $LiPF_6$ (lithium hexafluorophosphate). The lithium ions, $Li^+$, react at the electrodes during operation of the battery. The $PF_6^-$ ions do not react at the electrodes and are therefore considered as the counter-ions. Examples of layers with low permeability to counter-ions are described in U.S. Patent Publication No. 2018/0358598, the entire contents of which are incorporated herein by reference.

The use of a low counter-ion permeability layer as the electronically insulating layer(s) 220a, 220b enables battery 100 to have different counter-ions adjacent to the positive electrode 204 than adjacent to the negative electrode 212. For example, in one embodiment, $LiBF_4$ (lithium tetrafluoroborate) is used to provide the counter-ions adjacent to the positive electrode 204, while LiTFSI (lithium(bis(trifluoromethanesulfonyl) imide) is used to provide the counter-ions near the negative electrode 212. Using different counter-ions at the positive electrode 204 and negative electrode 212 provides greater voltage stability, reduces production cost, and/or enables greater current densities as compared to batteries that use of a single salt throughout a battery.

In embodiments in which a low counter-ion permeability layer that is one or more of the electronically insulating layers 220a, 220b and which also has low permeability to solvents further enables the battery 100 to have different solvents near the positive electrode 204 than near the negative electrode 212. For instance, in one embodiment, the solvent polyethylene oxide (or a block copolymer containing polyethylene oxide) is used as an electrolyte in the separator 208, while acetonitrile is used as the electrolyte in the positive electrode 204. This combination advantageously enables a higher voltage positive electrode active material, for example NCA, to be used due to the high voltage stability of acetonitrile, increasing energy density, while also allowing a low voltage stable mechanically robust separator 208.

In one particular embodiment, the concentration of salt near the negative electrode 212 is greater than the concentration of salt near the positive electrode 204. The use of different salt concentrations enables the battery 100 to have greater charging rate capability, and also decreases aging of the battery 100. The range of concentrations near the negative electrode may be between 10% and 99% by mass, while the range of concentrations near the positive electrode may be between 10% and 99% by mass.

Furthermore, in some embodiments, the addition of a low counter-ion permeability layer as the electronically insulating layer(s) 220a, 220b enables the use of different additives near the negative electrode 212 and near the positive electrode 204, provided that it is also a low permeability layer for the additives. Such additives may improve interfacial stability between materials in the electrode configuration 200. For example, vinylene carbonate may be used against the negative electrode 212 in some embodiments.

In other embodiments, one or both of the electronically insulating layers 220a, 220b may include a single ion conducting (SIC) layer. Examples of SIC layers that are used in various embodiments as the electronically insulating layer are described in U.S. Patent Publication No. 2019/0036158, the entire contents of which are incorporated herein by reference.

The SIC electronically insulating layer(s) 220a, 220b may be relatively thin, continuous, single-ion conducting layer deposited on one or both of the electrodes 204, 212. In some embodiments, the SIC electronically insulating layer(s) 220a, 220b may be formed of Lithium phosphorous oxynitride ("LiPON"), which has a low ionic conductivity at room temperature (approximately $10^{-6}$ S/cm), but can be deposited as a thin film to reduce the ionic resistance of the SIC electronically insulating layer(s) 220a, 220b.

The SIC electronically insulating layer(s) 220a, 220b serve to compartmentalize the salt in each electrode 204, 212, thereby reducing counter-ion transport and decreasing salt polarization or concentration differences at high currents. As a result, the charge and discharge rate capability of the battery cell is improved over a conventional battery.

Since the electronically insulating layer(s) 220a, 220b serve to prevent short-circuit of the battery through the separator 208, a wider variety of materials may be used for the protrusion inhibiting layer 224. In particular, because the electronically insulating layer(s) 220a, 220b prevent the battery from short-circuiting, the protrusion inhibiting layer may have non-negligible electronic conductivity due to incorporation of a constituent material that effectively limits the growth of lithium protrusions through the separator 208. When the material for the protrusion inhibiting layer 224 is not limited by the requirement that it must be electronically insulating, there are numerous options for limiting the growth of lithium protrusions through the separator 208. For instance, the growth of lithium protrusions may be limited as a result of mechanical robustness of the protrusion inhibiting layer 224, ability of the protrusion inhibiting layer 224 to chemically terminate lithium protrusions, or the layer 224 may have superior ionic transport compared to the current state-of-the-art. In some embodiments, for example, the protrusion inhibiting layer has an electrical conductivity that is greater than $10^{-4}$ S/m, while in other embodiments the protrusion inhibiting layer 224 has an electrical conductivity that is greater than 0.01 S/m.

In some embodiments, the protrusion inhibiting layer 224 consists of a pure material, while in other embodiments, the protrusion inhibiting layer 224 includes or consists of a composite that includes several constituent materials. The protrusion inhibiting layer 224 may include at least one constituent material that inhibits growth of lithium protrusions, but renders the protrusion inhibiting layer 224 electronically conductive and therefore unsuitable for use as a separator in a conventional battery cell structure.

Figure 5:
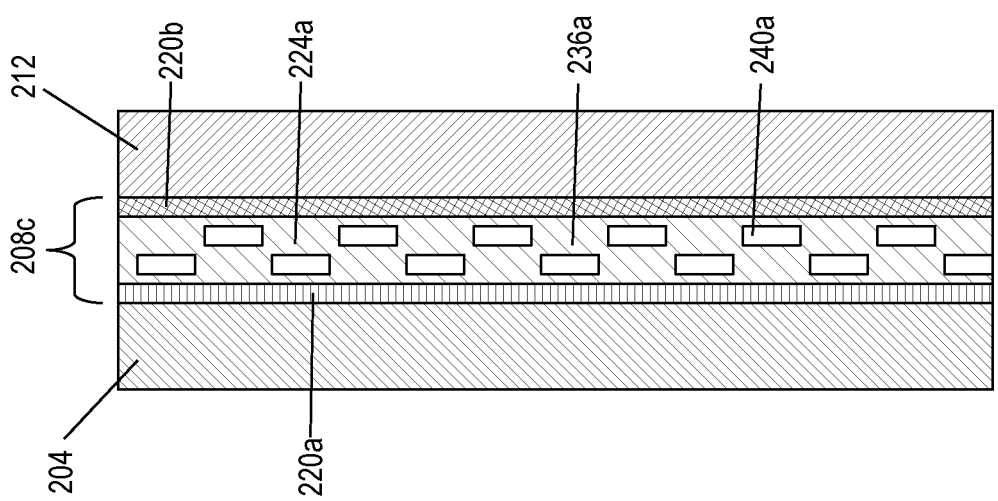
FIG. 5 is a schematic view of a battery cell of the battery pack of FIG. 1 having a separator layer in which a lithium protrusion inhibiting layer includes a lithium ion conducting layer and a protrusion growth inhibiting constituent that improves the mechanical properties of the lithium protrusion inhibiting layer.

FIG. 5 illustrates an embodiment in which the protrusion inhibiting layer 224a of the separator 208c is formed from a primary lithium ion conducting material 236a and at least one lithium protrusion growth inhibiting constituent 240a. In some embodiments, the lithium ion conducting material 236a includes or consists of a solid lithium ion electrolyte such as polyethylene oxide, LLZO, LiPON, LATP, $Li_2S$—$P_2S_5$, $Li_3PS_4$ and/or any other desired solid lithium ion conductor.

Figure 6:
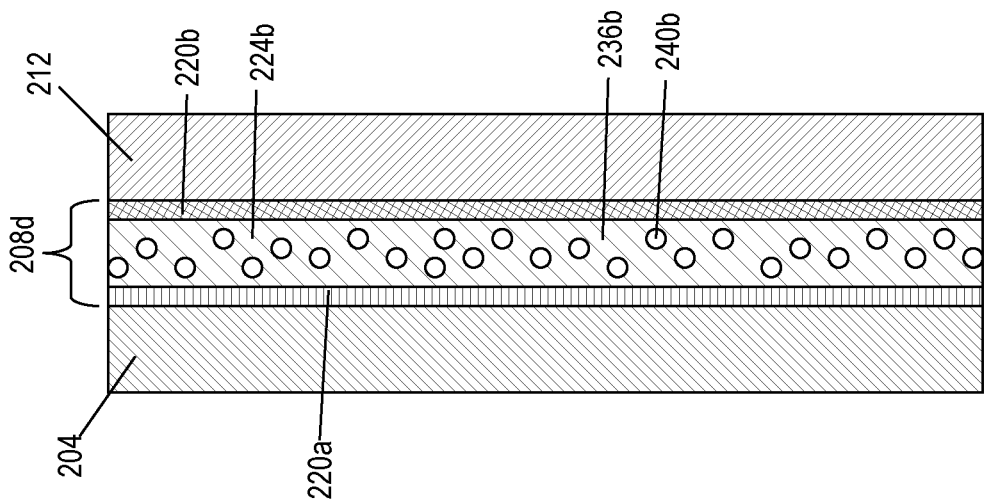
FIG. 6 is a schematic view of a battery cell of the battery pack of FIG. 1 having a separator layer in which a lithium protrusion inhibiting layer includes a lithium ion conducting layer and a protrusion growth inhibiting constituent that chemically reacts with the lithium protrusions.

The protrusion inhibiting layer 224a further includes at least one constituent 240 that inhibits growth of lithium protrusions through improvement in the mechanical properties of layer 224a, for example, by increasing the ductility, tensile strength, or fracture toughness of the protrusion inhibiting layer 224a. The lithium protrusion growth inhibiting constituent 240 that improves mechanical properties of the electrolyte, but leads to non-negligible electronic conductivity of the protrusion inhibiting layer 224a may include or consist of, for example, carbon nanotubes, silver nanowires, particles of silver, steel, copper, or lithium, or other desired materials that are electronically conducting and have either high tensile strength, high ductility, or high fracture toughness. For example, the protrusion inhibiting layer 224a may be mechanically robust layer with a shear modulus of greater than $\frac{1}{10}$ of the shear modulus of lithium metal and, in one particular embodiment, greater than double the shear modulus of lithium metal at the operating temperature of the battery. Additionally or alternatively, the mechanically robust protrusion inhibiting layer 224a may, in some embodiments, have a fracture toughness of greater than $10^4$ $Pa*m^{1/2}$, while in other embodiments the mechanically robust protrusion inhibiting layer 224a has a fracture toughness of greater than 105 $Pa*m^{1/2}$ FIG. 6 illustrates an embodiment in which the protrusion inhibiting layer 224b of the separator 208d includes a lithium ion conducting material 236b and a lithium protrusion growth inhibiting constituent 240b that chemically reacts with lithium protrusions so as to limit the growth of lithium protrusions. The lithium conducting material 236b may be, for example, a solid lithium ion electrolyte such as polyethylene oxide, LLZO, LiPON, LATP, $Li_2S$—$P_2S_5$, $Li_3PS_4$ or any other solid lithium ion conductor. The lithium protrusion growth inhibiting constituent chemically reduces or terminates the growth of lithium protrusions by, for example, alloying with the lithium in the protrusions. The growth inhibiting constituent 240b may include, for example, one or more of aluminum, tin, magnesium, silicon, silver, and gold, or any other suitable materials that chemically reacts with lithium. The growth inhibiting constituent 240b is configured such that once the growth inhibiting constituent 240b begins reacting with the lithium to alloy with the lithium, the protrusion growth of the lithium is reduced or terminated.

In conventional batteries, the material from which a separator is formed is limited to materials that are electronically insulating so as to avoid short-circuiting the battery. In the present disclosure, however, the electronically insulating layer(s) 220a, 220b provide the electronic insulation, thereby enabling use of a material that is electronically conductive as a lithium protrusion inhibiting layer 224, 224a, 224b. As a result, since lithium protrusion formation or growth is inhibited, the battery can be operated at higher current densities than conventional batteries without risking protrusions causing a short circuit in the battery.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:
1. An electrode configuration for a battery cell, comprising:
a positive electrode;
a negative electrode; and
a separator interposed between the positive electrode and the negative electrode, the separator comprising:
a protrusion inhibiting layer that is electrically conductive, the protrusion inhibiting layer comprising a lithium ion conducting material and a lithium pro- trusion growth inhibiting constituent interspersed within the lithium ion conducting material; and
a first electronically insulating layer interposed between and electrically insulating the protrusion inhibiting layer from one of the positive and negative electrode.

2. The electrode configuration as recited in claim 1, wherein the protrusion inhibiting layer has a greater shear modulus than the other of the positive and negative electrode so as to mechanically inhibit growth of lithium protrusions on the other of the positive and negative electrode.

3. The electrode configuration as recited in claim 2, wherein the lithium protrusion growth inhibiting constituent comprises one or more of carbon nanotubes, silver nanowires, particles of silver, particles of steel, particles of copper, and particles of lithium.

4. The electrode configuration as recited in claim 3, wherein the primary lithium ion conducting material includes at least one material selected from the group consisting of polyethylene oxide, lithium-lanthanum-zirconium-oxide (LLZO), lithium phosphorus oxynitride (LiPON), lithium-aluminum-titanium-phosphate (LATP), $Li_2S$—$P_2S_5$, and $Li_3PS_4$.

5. The electrode configuration as recited in claim 1, wherein the protrusion inhibiting layer is configured to chemically inhibit growth of lithium protrusions on the other of the positive and negative electrode.

6. The electrode configuration as recited in claim 5, wherein the lithium protrusion growth inhibiting constituent comprises an alloying material that alloys with lithium in the battery so as to inhibit growth of lithium protrusions.

7. The electrode configuration as recited in claim 6, wherein the alloying material includes one or more material selected from the group consisting of aluminum, tin, magnesium, silicon, silver, and gold.

8. The electrode configuration as recited in claim 6, wherein the lithium ion conducting material includes at least one material selected from the group consisting of polyethylene oxide, lithium-lanthanum-zirconium-oxide (LLZO), lithium phosphorus oxynitride (LiPON), lithium-aluminum-titanium-phosphate (LATP), $Li_2S$—$P_2S_5$, and $Li_3PS_4$.

9. The electrode configuration as recited in claim 1, wherein the first electronically insulating layer includes one or more materials selected from the group consisting of: PEO with conducting salt; gels with the addition of carbonate solvent and conducting salt; ceramic single ion conductors; lithium-lanthanum-zirconium-oxide (LLZO); lithium phosphorus oxynitride (LiPON); lithium-aluminum-titanium-phosphate (LATP); glassy single ion conductors; atomic layer deposition layers of lithium conducting, electronically insulating materials; $Al_2O_3$; $Li_3P$; $Si_3N_4$; cation exchange polymers; and a perfluorosulfonic acid membrane.

10. The electrode configuration as recited in claim 1, wherein the first electronically insulating layer has low permeability to counter-ions.

11. The electrode configuration as recited in claim 1, wherein the first electronically insulating layer includes a single ion conducting layer.

12. The electrode configuration as recited in claim 1, the separator further comprising a second insulating layer that electrically insulates the protrusion inhibiting layer from the other of the positive and negative electrode.

13. A battery cell comprising:
an electrode configuration comprising:
a positive electrode;
a negative electrode; and
a separator interposed between the positive electrode and the negative electrode, the separator comprising:
a protrusion inhibiting layer that is electrically conductive, the protrusion inhibiting layer comprising a lithium ion conducting material and a lithium protrusion growth inhibiting constituent interspersed within the lithium ion conducting material; and
a first electronically insulating layer interposed between and electrically separating the protrusion inhibiting layer from one of the positive and negative electrode.

14. The battery cell as recited in claim 13, wherein the protrusion inhibiting layer is configured to mechanically inhibit growth of lithium protrusions on the other of the positive and negative electrode.

15. The battery cell as recited in claim 14, wherein the lithium protrusion growth inhibiting constituent comprises one or more of carbon nanotubes, silver nanowires, particles of silver, particles of steel, particles of copper, and particles of lithium.

16. The battery cell as recited in claim 15, wherein the primary lithium ion conducting material includes at least one material selected from the group consisting of polyethylene oxide, lithium-lanthanum-zirconium-oxide (LLZO), lithium phosphorus oxynitride (LiPON), lithium-aluminum-titanium-phosphate (LATP), $Li_2S$—$P_2S_5$, and $Li_3PS_4$.

17. The battery cell as recited in claim 13, wherein the protrusion inhibiting layer is configured to chemically inhibit growth of lithium protrusions on the other of the positive and negative electrode.

18. The battery cell as recited in claim 17, wherein the lithium protrusion growth inhibiting constituent comprises an alloying material that alloys with lithium in the battery so as to inhibit growth of lithium protrusions.

19. The battery cell as recited in claim 18, wherein the alloying material includes one or more material selected from the group consisting of aluminum, tin, magnesium, silicon, silver, and gold.

20. The electrode configuration as recited in claim 1, wherein the protrusion inhibiting layer has a fracture toughness of greater than $10^4$ Pa*$m^{1/2}$.

* * * * *